(12) United States Patent
Leigh et al.

(10) Patent No.: US 10,140,741 B2
(45) Date of Patent: Nov. 27, 2018

(54) COLLECTION AND VALIDATION OF DATA FROM VISUAL DISPLAYS

(71) Applicant: General Electric Company, Schenectady, NY (US)

(72) Inventors: Nigel Trevor Leigh, Canterbury (NZ); Brett Ralph Taylor, Canterbury (NZ); Robert Steven Craft, Waterford, CT (US); Stephen James Post, Canterbury (NZ)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/967,913

(22) Filed: Dec. 14, 2015

(65) Prior Publication Data

US 2017/0169593 A1    Jun. 15, 2017

(51) Int. Cl.
  *G06T 11/60* (2006.01)
  *G06T 7/00* (2017.01)
  (Continued)

(52) U.S. Cl.
  CPC .............. *G06T 11/60* (2013.01); *G06K 9/22* (2013.01); *G06T 7/0042* (2013.01); *G06T 7/75* (2017.01);
  (Continued)

(58) Field of Classification Search
  CPC ....................................... G06T 11/60
  (Continued)

(56) References Cited

U.S. PATENT DOCUMENTS

| 5,275,553 A | 1/1994 | Frish et al. |
| 5,442,737 A * | 8/1995 | Smith .................. G06T 11/206 345/639 |

(Continued)

FOREIGN PATENT DOCUMENTS

| JP | 2002277291 A | 9/2002 |
| JP | 2015011674 A | 1/2015 |

OTHER PUBLICATIONS

"NDT—Nokia Data Logger," SourceForge.net, Retrieved from the Internet URL: http://sourceforge.net/projects/nkdatlog, on Jun. 28, 2017 pp. 1-2.

(Continued)

*Primary Examiner* — Shivang Patel
(74) *Attorney, Agent, or Firm* — Mintz Levin Cohn Ferris Glovsky and Popeo, P.C.

(57) ABSTRACT

A mobile computing device for providing an indication of process readings of a machine includes a processor configured to receive an image of a process indicator wherein capture of the image is initiated using the mobile computing device proximate the machine. The at least one processor is also configured to determine a template including a template image of the process indicator and template components of the process indicator. The at least one processor is further configured to display the received image and the determined template image such that they overlay each other and align the received image with the determined template image. The at least one processor is also configured to determine a position of a value indicator with respect to a scale of the process indicator, transform the determined position to a process indicator value, and store the process indicator value in the one or more memory devices.

21 Claims, 7 Drawing Sheets

(51) Int. Cl.
*G06T 7/73* (2017.01)
*G06K 9/22* (2006.01)
(52) U.S. Cl.
CPC ..... *G06K 2209/01* (2013.01); *G06K 2209/03* (2013.01); *G06T 2207/10004* (2013.01); *G06T 2207/20221* (2013.01); *G06T 2207/30121* (2013.01); *G06T 2207/30164* (2013.01)
(58) Field of Classification Search
USPC ........................................................ 345/633
See application file for complete search history.

(56) References Cited

U.S. PATENT DOCUMENTS

| | | | |
|---|---|---|---|
| 6,000,612 A | 12/1999 | Xu | |
| 7,792,363 B2 | 9/2010 | Foss | |
| 2003/0152145 A1 | 8/2003 | Kawakita | |
| 2009/0010484 A1* | 1/2009 | Amidi | H04N 1/32101 382/100 |
| 2009/0322884 A1* | 12/2009 | Bolick | G01D 4/008 348/160 |
| 2014/0058635 A1* | 2/2014 | Furukawa | B60R 16/02 701/50 |
| 2014/0098209 A1 | 4/2014 | Neff | |

OTHER PUBLICATIONS

Extended EP Search Report, dated Apr. 25, 2017, for co-pending EP patent application No. EP 16200649.8 (8 pgs.).

* cited by examiner

COLLECTION AND VALIDATION OF DATA FROM VISUAL DISPLAYS

BACKGROUND

The present disclosure relates generally to inspection systems and, more specifically, to inspection systems and methods for capturing data from process indicators and validating the integrity of the collected data.

Machine monitoring and diagnostics can be seen as a decision-support tool which is capable of identifying the cause of failure in a machine component or system, such as a power generator, as well as predicting its occurrence from a symptom. Without accurate detection and identification of the machine fault, maintenance and production scheduling cannot be effectively planned and the necessary repair tasks cannot be carried out in time. Therefore, machine monitoring and diagnostics are essential for an effective, predictive maintenance program.

At least one purpose of using machine monitoring and diagnostics is to increase equipment availability, as well as reduce maintenance and unexpected machine breakdown costs. In order to maximize availability, system managers often work to increase reliability by maximizing the machine uptime and, at the same time, increase maintainability by minimizing the mean time to repair. As a result of monitoring and diagnostics, the frequency of unexpected machine breakdown may be significantly reduced, and machine problems may be pinpointed more quickly.

In some known monitoring systems, machine monitoring and diagnostics may be done by simply listening to the sound generated during machine operation, or by visually examining the quality of machined parts to determine machine condition. However, many machine faults, for example, wear and cracks in bearings and gearboxes, are not accurately assessed by relying only on visual or aural observations, especially during operation. In some known systems, operators collect data on machine conditions through visual inspection of machine process indicators, and may enter such data into a historical data tracking computing system. However, such systems are prone to operator error. For example, an operator may misinterpret or misread a generator process indicator, for example, the operator may perceive a process indicator value of 5.605 from a digital process indicator that is actually showing a value of 5,605, or may read the wrong generator process indicator for example, collect and input a process indicator value from the wrong generator, or from the wrong process indicator at the correct generator.

Therefore, more sophisticated data collection and analysis techniques have been developed to help the maintenance technician and engineer collect data used for detecting and diagnosing machine failures.

BRIEF DESCRIPTION

In one embodiment, a mobile computing device for providing an indication of process readings of a machine includes a memory device, a display device, a camera, and at least one processor. The at least one processor is configured to receive an image of a process indicator from the camera, wherein capture of the image is initiated by a user of the mobile computing device while the user is proximate the machine and determine a template associated with the process indicator, the template including a template image of the process indicator and template components of the process indicator. The at least one processor is further configured to display the received image and the determined template image such that one of the received image and the determined template image overlay the other of the received image and the determined template image and align the received image with the determined template image. The at least one processor is also configured to determine a position of a value indicator with respect to a scale of the process indicator, transform the determined position to a process indicator value, and store the process indicator value in the one or more memory devices.

In another embodiment, a computer-based method for providing an indication of process readings of a machine using a mobile computing device coupled to a user interface, and camera, and a memory device includes receiving an image of a process indicator from the camera, wherein capture of the image is initiated by a user of the mobile computing device while the user is proximate the machine. The method also includes determining a template associated with the process indicator, the template including a template image of the process indicator and template components of the process indicator. The method further includes displaying the received image and the determined template image overlaid together. The method also includes aligning the received image with the determined template image, determining a position of a value indicator with respect to a scale of the process indicator, transforming the determined position to a process indicator value, and storing the process indicator value in the one or more memory devices.

In yet another embodiment, one or more non-transitory computer-readable storage media having computer-executable instructions embodied thereon, wherein when executed by at least one processor of a mobile computing device cause the processor to receive an image of a process indicator from the camera, wherein capture of the image is initiated by a user of the mobile computing device while the user is proximate the machine. The computer-executable instructions further cause the processor to determine a template associated with the process indicator, the template including a template image of the process indicator and template components of the process indicator and display the received image and the determined template image overlaid together. The computer-executable instructions also cause the processor to align the received image with the determined template image, determine a position of a value indicator with respect to a scale of the process indicator, transform the determined position to a process indicator value, and store the process indicator value in the one or more memory devices.

BRIEF DESCRIPTION OF THE DRAWINGS

FIGS. 1-7 show example embodiments of the method and system described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital media, with the sole exception being a transitory, propagating signal.

As used herein, the terms "software" and "firmware" are interchangeable, and include any computer program stored in a memory device for execution by devices that include, without limitation, mobile computing devices, clusters, personal computers, workstations, clients, and servers.

As used herein, a "camera" refers to an image capture device or photo sensor configured to transfer a captured image of an object to a computer readable memory device. As used herein, a camera will generally refer to a digital image capture device unless otherwise specified. Additionally, a camera will generally be integrated into a mobile, handheld, and wireless digital device unless otherwise specified.

Embodiments of the disclosed subject matter describe inspection systems that use a camera to capture images of gauges or other process indicators and convert those captured images into the process values represented on the gauge into an electronic format. Other embodiments are within the scope of the disclosed subject matter. The inspection systems also validate the integrity of the collected data.

A data collection system, device, and method described herein provide for collection and validation of data from process indicators and visual displays. In one exemplary embodiment, a field operator collects operating parameters, such as, but not limited to, motor speed, temperature, flow rate, associated with an asset, for example, a power generator, or associated components, such as turbines, pumps, compressors, or the like, using a portable or handheld data collection device, herein referred to as the "handheld device." For example, the field operator may walk a "route" within a power generation facility that includes a plurality of power generators, each generator having one or more process indicators or gauges that provide data that may be collected and analyzed to monitor machine health. The field operator uses the handheld device, for example, a mobile computing device, such as a tablet or smartphone that includes a camera to capture and process images of the process indicators. The collection system is configured to determine the process indicator value ("sample value") from the image and, in some embodiments, transmit this process indicator value from the handheld device to a monitoring server.

To facilitate proper data collection, the process indicator data collection system is pre-configured with a "template frame" for each of a plurality of process indicators. More specifically, a user configures a subject process indicator for use with the process indicator data collection system by capturing a representative image ("model image") of the subject process indicator. The user then constructs a template frame for the subject process indicator using a configuration module. In one example embodiment, the configuration module displays the sample image to the user and the user creates one or more framing elements around structural or visually-distinguishing features on or over the model image, such as the outer edges of the subject process indicator, text or features within or near the subject process indicator, or the outline of other nearby process indicators or other visible features. During data collection, the field operator approaches the subject process indicator and orients the handheld device toward the subject process indicator. On the display screen, the collection device projects a real-time display of the subject process indicator as viewed through a camera. Further, the collection device overlays the template frame for the subject process indicator onto the display. On the display, the real-time display from the camera may change (e.g., as the field operator moves the device) but, in some embodiments, the template frame remains stationary.

As such, the field operator physically reorients the collection device until the real-time display of the process indicator approximately matches the template frame (e.g., until the framing elements of the template frame are approximately aligned with the visual elements of the process indicator and surrounding environment). For example, the field operator may move the collection device slightly to the left/right, or up/down, or farther or nearer from the subject process indicator until elements of the template frame are appropriately aligned. In some embodiments, once the frame appears to be aligned, the field operator collects a digital image of the process indicator ("sample image"). In other embodiments, the collection device is configured to determine that alignment has been achieved and automatically collect the sample image.

Once the sample image is collected, the process indicator data collection system identifies the process indicator value ("sample value") from the sample image using, e.g., pattern recognition techniques. The process indicator value is then compared to pre-configured data about the subject process indicator, such as an expected (e.g., normal) operating range. The collection device then displays the sample value (as interpreted from the image) and warns the field operator if the sample value is outside the expected operating range. The field operator may then accept the displayed value, re-take the image, manually enter a value, or elect to cancel/skip collection for this process indicator. If the sample value is accepted, that sample value, and in some embodiments the sample image, is stored and/or transmitted to a data collection system for use in, e.g., monitoring or analyzing machine performance or health. As such, the process indicator data collection system facilitates more reliable collection and validation of data from process indicators and other visual displays.

As used herein, the term "real-time display" is used to refer to the images displayed on the display of a handheld device while the handheld device's camera is active. As is typical with many known handheld devices having integrated or attached cameras, the handheld device includes a camera, which, when active, continuously captures images through the camera and continuously displays those images on the display. In other words, the user sees what looks like an ongoing, full-motion, real-time "movie" through the perspective of the camera and displayed on the mobile device's screen. The term "image" is used herein to refer to a static graphic or "picture," e.g., as captured by the camera when a digital image is collected. As such, since static images and the real-time display are captured through the camera, the real-time display may be used, for example, to approximate what a static image may look like if collected at that moment.

Figure 1:
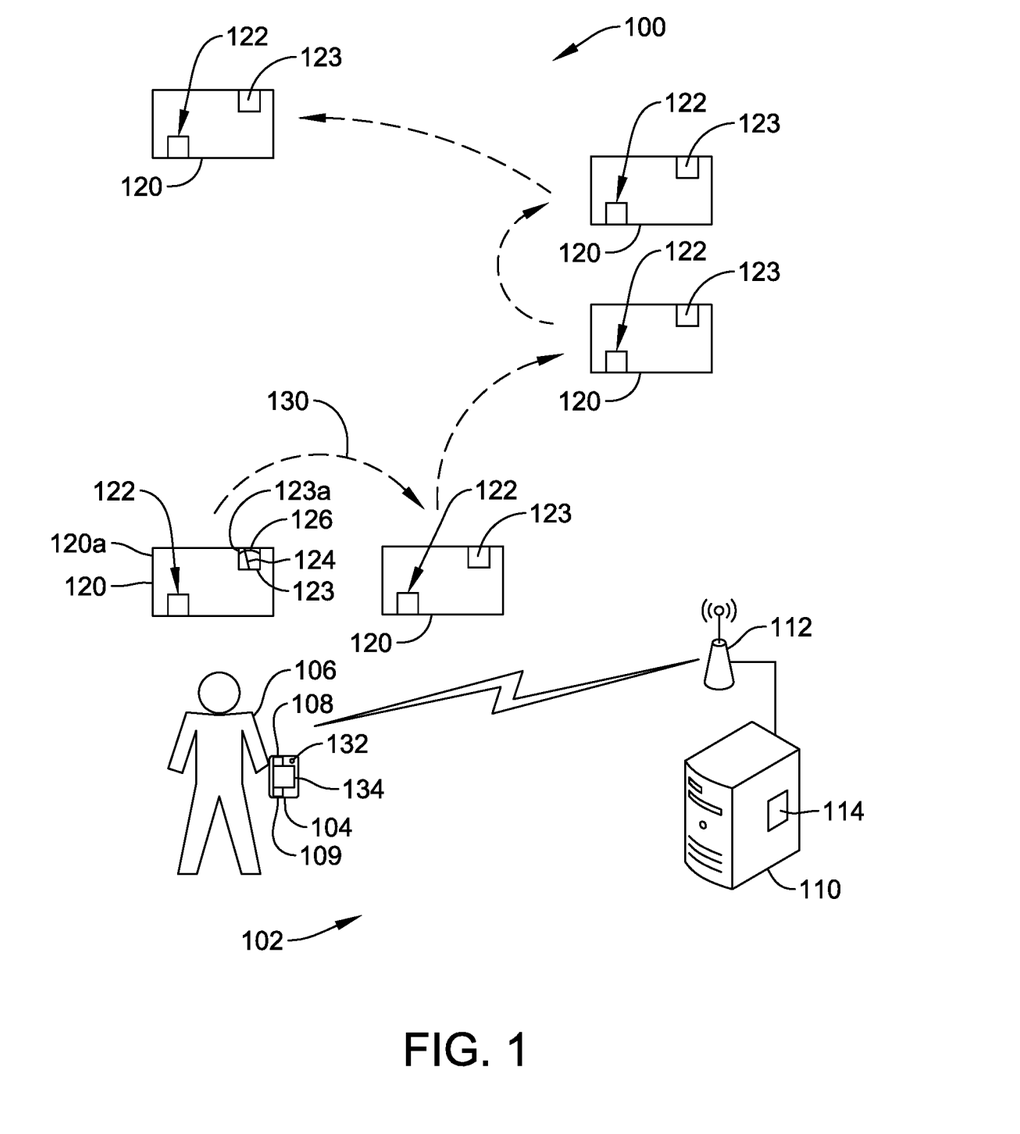
FIG. 1 is a diagram of an exemplary machine environment in which a field operator collects process indicator values from one or more assets using an exemplary inspection system.

FIG. 1 is a diagram of a machine environment 100 in which a field operator ("operator") 106 collects process indicator values from one or more assets 120 such as, but not limited to, turbine engines using an exemplary inspection system 102 that includes an inspection device 104, including a processor 108 and a memory device 109, communicatively coupled to a server device 110 and a database 114 through for example, a wired connection, a wireless transceiver, and/or a wireless network adapter 112. In the exemplary embodiment, machine environment 100 is a power generation environment that includes a plurality of turbines, any of which may be regularly monitored for machine health. Operator 106 walks a path or "route" 130 through environment 100 and collects operating parameters ("sensor data") that may originate from respective sensors 122. Process indicators 123 provide a visual display of a value that quantifies an operating parameter of asset 120 using a process indicator 123. Exemplary operating parameters include running speed of a motor of asset 120, as well as temperature, flow rate, and the like. Process indicators 123 may include any type of visual display that enables the systems and methods described herein. For example, some process indicators 123 may be digital displays showing a numeric readout, other process indicators 123 may be needle displays with a sweeping needle 124 and a scale 126.

In the exemplary embodiment, operator 106 carries inspection device 104 while walking route 130. Inspection device 104 is embodied in a handheld mobile computing device, such as a smartphone or tablet computer, that includes an integrated or attached camera 132 embodied in, for example, a camera device and a display screen 134. Further, in some embodiments, inspection device 104 includes a wireless network adapter 112 embodied in a Wi-Fi adapter or a cellular network adapter that facilitates wireless communication with, for example, server device 110 and database 114. Inspection device 104 is configured to present a real-time display to operator 106 as captured by camera 132, as well as capture images of process indicators 123. In some embodiments, inspection device 104 is a tablet computing device that includes a display interface that also functions as an input device, and may run, for example, the Android® operating system offered by Google Inc. of Mountain View, Calif.

During operation, in the exemplary embodiment, inspection device 104 presents route 130 to operator 106. For example, inspection device 104 may display an ordered series of process indicator locations (e.g., a subject asset 120a and a subject process indicator 123a associated with that subject asset 120a) such as to define route 130 for operator 106. At each asset 120, for example, subject asset 120a, operator 106 stops to collect one or more "sample images" of subject process indicator 123a. Collection and analysis of these sample images are described in greater detail below.

Figure 2:
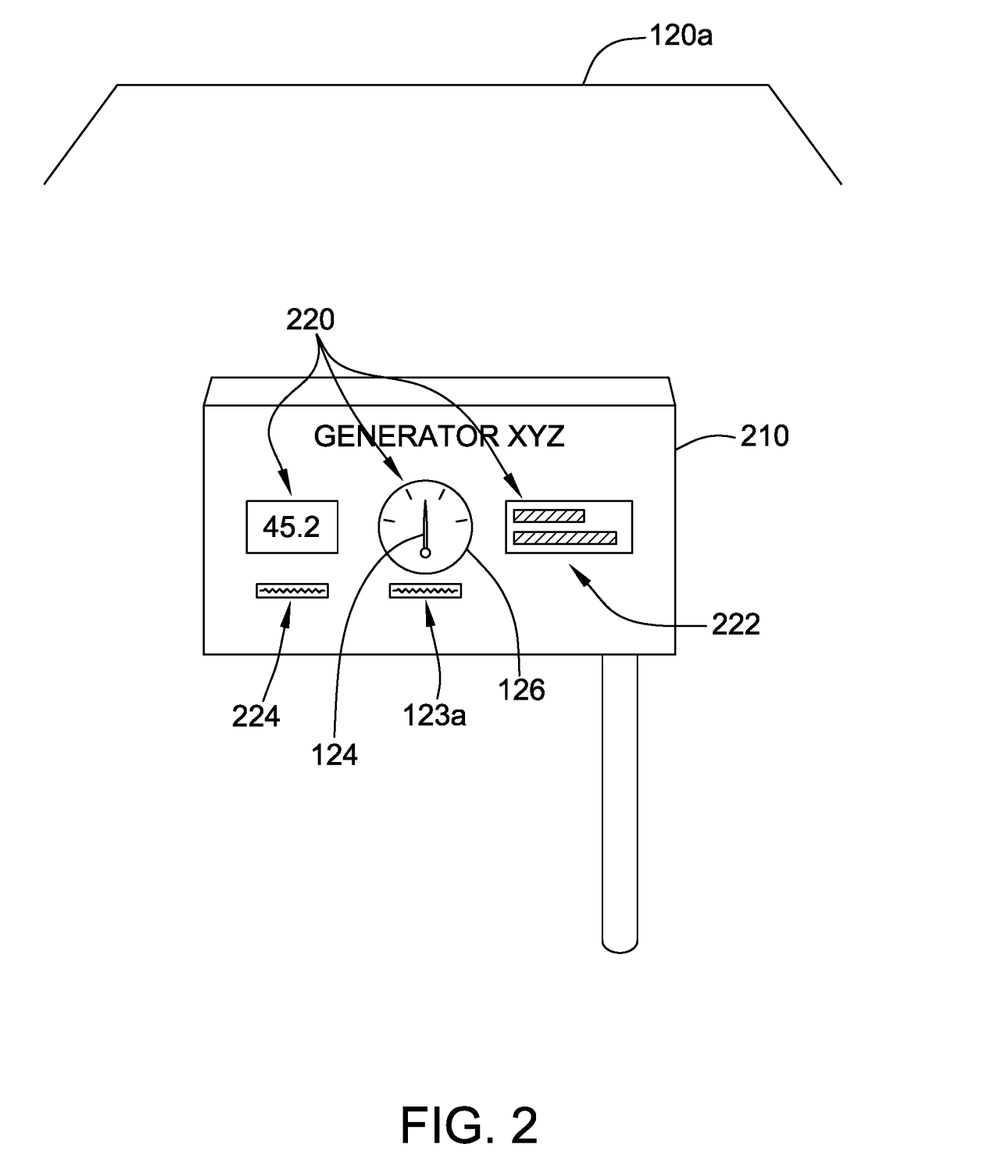
FIG. 2 is a diagram of an exemplary sensor panel associated with an asset of the one or more assets shown in FIG. 1 and on which are mounted a plurality of process indicators.

FIG. 2 is a diagram of an exemplary sensor panel 210 associated with asset 120a, and on which are mounted a plurality of process indicators 220, also referred to as sensor displays, including subject process indicator 123a. In the exemplary embodiment, sensor panel 210 is located within machine environment 100 (shown in FIG. 1) near asset 120a. Process indicators 220 include a bar graph process indicator 222, a digital process indicator 224, and subject process indicator 123a. In the example embodiment, subject process indicator 123a is a needle-style process indicator that includes scale 126 over which needle 124 rotates to project the underlying value read by the sensing element. However, any style of process indicator display that enables the systems and methods described herein may be used.

To facilitate data collection and analysis of process indicator data from subject process indicator 123a, inspection system 102 (shown in FIG. 1) performs two main functions: (i) configuration of a process indicator within inspection system 102; and (ii) capture and analyze a sample image.

Figure 3:
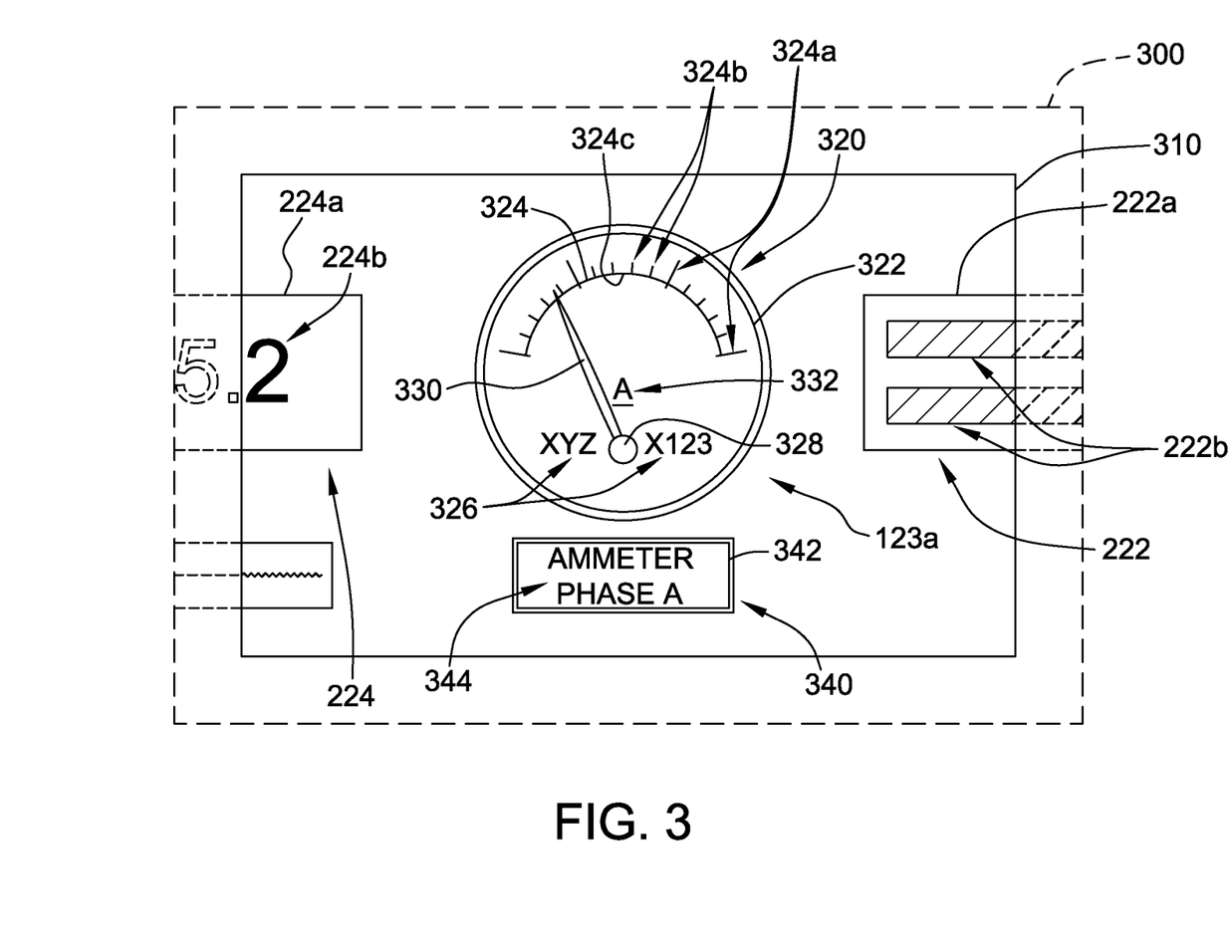
FIG. 3 is an exemplary digital image of a portion of the sensor panel shown in FIG. 2.

FIG. 3 is an exemplary digital image 300 of a portion of sensor panel 210 (shown in FIG. 2), including the subject process indicator 123a and surrounding areas. For purposes of illustration and ease of description, elements of sensor panel 210 are illustrated and referred to herein in reference to their likenesses as they appear and are shown on digital image 300. In the exemplary embodiment, image 300 is a digital image taken, collected, or otherwise captured by camera 132 integrated with or otherwise attached to a handheld device such as inspection device 104 (shown in FIG. 1). Image 300 depicts portions 222a and 224a of adjacent process indicators 222 and 224, but is focused primarily on the subject process indicator 123a, which is approximately centered within image 300.

Image 300, in the example embodiment, includes various structural or other visually-distinguishing features, one or more of which may be used by inspection system 102 (shown in FIG. 1) during data collection and validation. For example, the subject process indicator 123a includes a primary display area 320 and a nearby label 340. Label 340 defines a frame boundary 342 within which characters 344 are printed (in this case, e.g., identifying the type of process indicator). Display area 320 defines a display boundary 322 circumscribing other elements of subject process indicator 123a, such as a scale 324, fixed display labels 326 and 332, and a meter needle 330 rotating about a needle center 328. Scale 324 further includes a plurality of long marks 324a and a plurality of tic marks 324b, each overlapping or connected to a semi-circular meter arc 324c. Further, image 300 includes visually-distinguishing features appearing near subject process indicator 123a, such as a portion of a border frame 222a, 224a or interior features 222b, 224b of nearby process indicators 222, 224.

In the example embodiment, during configuration of the subject process indicator 123a within inspection system 102, a system user (not shown) collects a reference image or "model image" 310 of the subject process indicator 123a. In some embodiments, a larger image 300 is cropped by the user to generate model image 310. This model image 310 is used by the user to construct a "template frame" associated with the subject process indicator 123a.

In the example embodiment, inspection system 102 includes a configuration module (not shown in FIG. 3) that enables the user to designate image 310 as a model image for the subject process indicator 123a that is used for frame construction for subject process indicator 123a. More specifically, in one embodiment, the configuration module presents the model image 310 on a display device (not shown in FIG. 3), as well as provides a set of geometric tools for use in conjunction with image 310. The geometric tools allow the user to generate one or more frame elements or pieces of the overall template frame for subject process indicator 123a.

Figure 4:
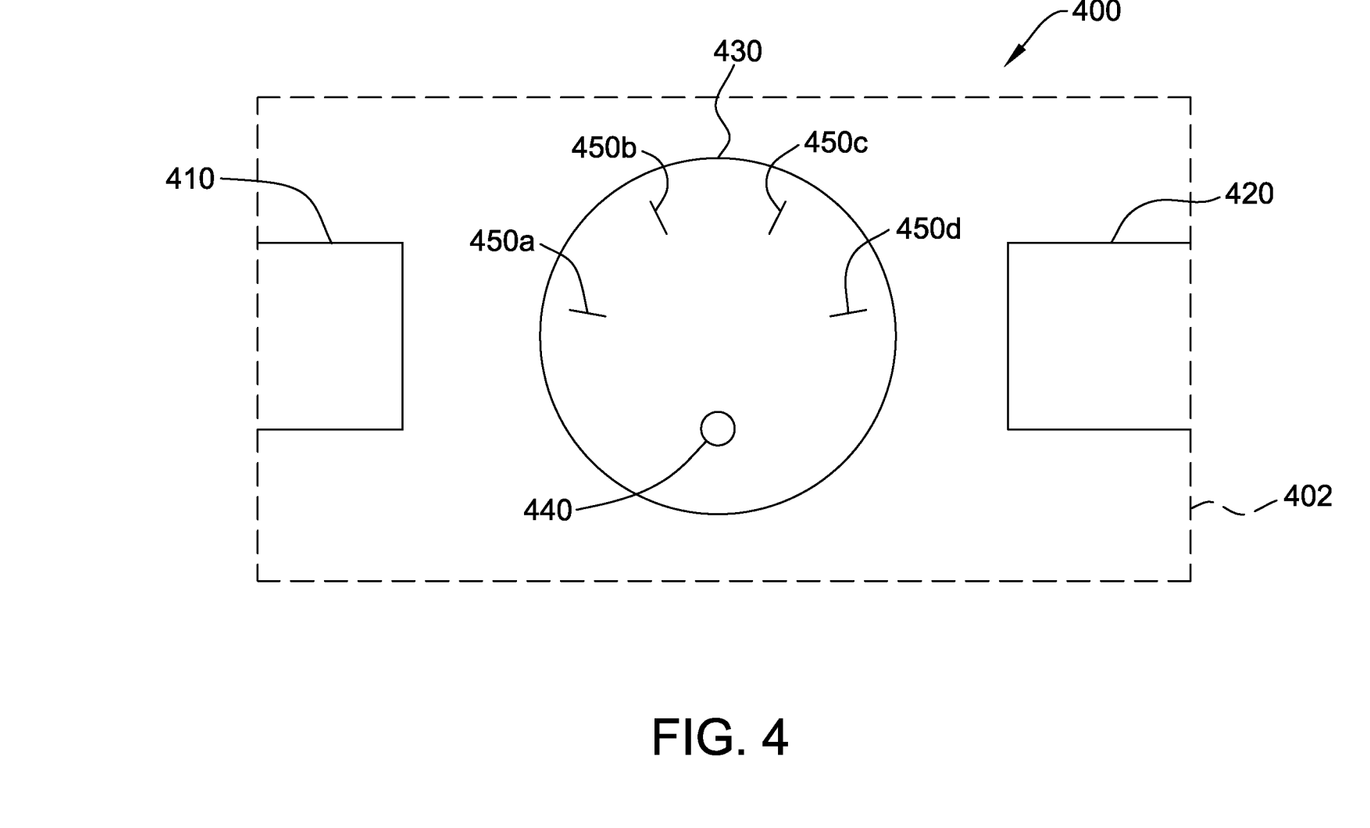
FIG. 4 is an exemplary template frame for the process indicator shown in FIG. 3.

FIG. 4 is an exemplary template frame 400 for subject process indicator 123a (shown in FIG. 3). In FIG. 4, solid lines are used to represent frame elements, or pieces of template frame 400, and dashed lines are used to represent a border 402, which is not a part of template frame 400, but rather is merely for illustrative purposes to show, e.g., the approximate size or border of model image 310. In the exemplary embodiment, template frame 400 includes a plurality of geometric shapes or lines such as a first semi-rectangle 410, a second semi-rectangle 420, a gauge circle 430, a needle center circle 440, and a plurality of hash lines 450a, 450b, 450c, and 450d. These geometric shapes are referred to herein as "template elements" and, collectively, make up template frame 400.

In reference now to FIGS. 3 and 4, during configuration of subject process indicator 123a for use with inspection system 102 (shown in FIG. 1), the configuration component presents model image 310 on the display device mentioned above. Further, the configuration module overlays template frame 400 onto model image 310 such that the frame elements are aligned and displayed over model image 310 (e.g., according to matching border 402 with the boundaries of model image 310. The configuration module also provides geometric shape-creating tools for a variety of geometric shape types such as, for example, circles, ellipses, rectangles, lines, triangles, and arcs.

The user creates one or more geometrically shaped template elements on or "over" the model image 310. More specifically, in one exemplary embodiment, the user identifies one or more visually-distinguishing features of the subject process indicator 123a and the surrounding area (e.g., the area visible within image 300 or model image 310). The user then creates geometric shapes to match a portion or all of the visually-distinguishing features. For example, the user may identify display boundary 322 of subject process indicator 123a as a visually-distinguishing feature of model image 310. The user may then create a feature element on template frame 400 on or over the image of display boundary 322. Since the display boundary 322 is approximately circular in shape, the user may select a circle/ellipse geometric shape tool provided by the configuration component. With the shape tool, the user creates gauge circle 430 (e.g., a circular-shaped feature element) onto or over model image 310 on the display. The user may resize and reposition gauge circle 430 on template frame 400 until gauge circle 430 approximately aligns with display boundary 322 on model image 310. In some embodiments, the user may use an outer edge or an inner edge of display boundary 322 with which to align gauge circle 430. In some embodiments, the user may create a template element for both the outer and inner edges of display boundary 322. In other embodiments, a width of gauge circle 430 may be adjusted such that gauge circle 430 is approximately the same width as a width of display boundary 322.

Similarly, the user may identify other visually-distinguishing features of model image 310 and create additional frame elements to reflect those features. Continuing the configuration of the exemplary template frame 400, the user identifies border frames 222a, 224a of nearby process indicators 222, 224 as visually-distinguishing features for which the user would like to create template elements. As such, and similarly, the user may use a semi-rectangle shape tool (or, e.g., a plurality of lines from a line shape tool) to create semi-rectangles 410, 420 on template frame 400 and align/resize those semi-rectangles 410, 420 to approximately match border frames 222a and 224a, respectively.

The user may select visually-distinguishing features of model image 310 to use for building template frame 400 that are not likely to change over time, and/or be independent of current (and perhaps transient or shifting) values of the subject process indicator 123a. Inspection system 102 may provide better performance with template frame 400 if most or all of the template elements are "fixed," and/or whose image appears approximately the same regardless of the current value of the subject process indicator. For example, needle 330 may be a less-reliable candidate for a template element because the alignment of needle 330 is directly tied to the current value of subject process indicator 123a. In other words, when the underlying value of subject process indicator 123a is lower, needle 330 changes orientation (e.g., counter-clockwise of the orientation shown in FIG. 3), and when the underlying value of subject process indicator 123a is higher, needle 330 changes orientation (e.g., clockwise of the orientation shown in FIG. 3). As such, if a template were created with needle 330 in the alignment shown in FIG. 3 and then later used by inspection system 102 to match a later-collected image of subject process indicator 123a, the template element associated with needle 330 may not match the current image of needle 330 if subject process indicator 123a is not displaying the same or approximately the same value. Similarly, any visually-distinguishing feature that may change or be obscured, e.g., depending on transient or changing conditions (e.g., needle 330, interior features 224b, 222b, and display label 332) may be lesser candidates for template elements of template frame 400, where visually-distinguishing features that are not likely to change or be obscured (e.g., display label 326, display boundaries 322, 342, and border frames 222a, 224a) may be more reliable or better-performing candidates for template elements of template frame 400.

In some embodiments, the configuration component identifies one or more visually-distinguishing features and creates one or more frame elements of the template frame automatically. For example, the configuration component may receive model image 310 and utilize optical or shape recognition software to identify display boundary 322 of subject process indicator 123a. The configuration component may recognize the shape of display boundary 322 as approximately circular, and may automatically generate gauge circle 430 and resize and/or reposition gauge circle 430 on template frame 400 to approximately overlay display boundary 322. In some embodiments, the one or more automatically-generated frame elements may be presented to the user, and the user may selectively remove some or all if, for example, they are likely to change over time, or be obscured in some situations.

As such, model image 310 acts as an assisting tool or image over which to create template frame 400, either by the user, automatically (e.g., by the configuration tool), or some combination of both. Each template element overlays a particular visually-distinguishing feature of model image 310 such that model image 310 acts as a background onto which template frame 400 aligns. Further, the frame elements of template frame 400 may be displayed in a particular color or with a particular graphic effect such that the user can visually distinguish or pick out the template elements from the background of model image 310. After the user has completed adding one or more template elements (e.g., the elements shown in template frame 400), the configuration component stores the template frame 400 for later use (e.g., in database 114, shown in FIG. 1).

It should be understood that the shape tools and geometric shapes described above are exemplary. Any shape tools and/or geometric shapes, or portions thereof, which enable the systems and methods described herein, may be provided by inspection system 102.

Figure 5:
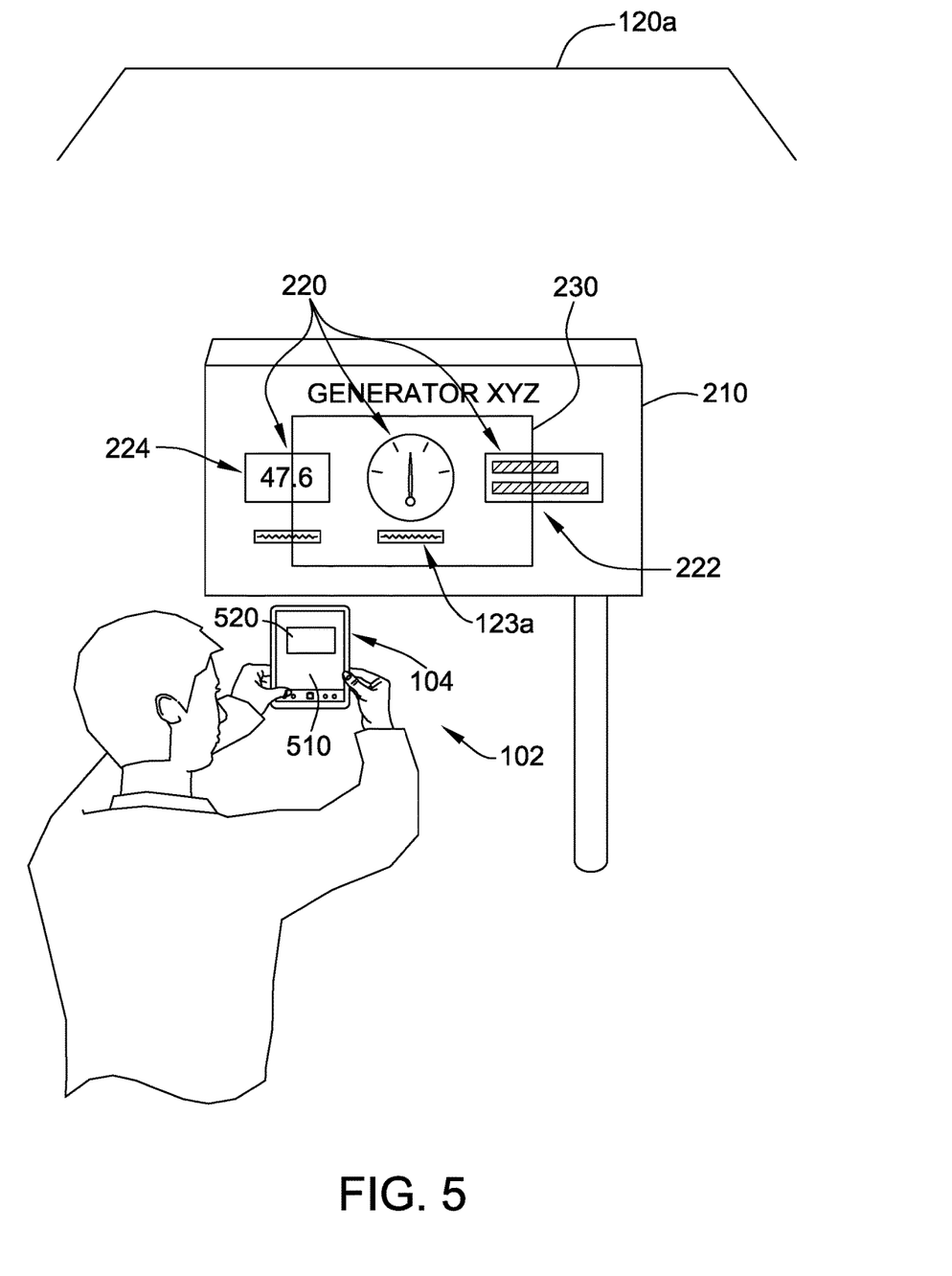
FIG. 5 is an illustration of the operator shown in FIG. 1 using the exemplary inspection system shown in FIG. 1, including the inspection device, to capture sample data from the subject process indicator.

FIG. 5 is an illustration of operator 106 using the exemplary inspection system 102 (shown in FIG. 1), including inspection device 104, to capture sample data from the subject process indicator 123a. During operation, operator 106 is directed by inspection system 102 to collect sample data (e.g., a sample image) from subject process indicator 123a associated with asset 120a. Operator 106 moves to the location of asset 120a within environment 100 (shown in FIG. 1) and approaches sensor panel 210. In some embodiments, inspection system 102 may present location information for asset 120a, sensor panel 210, and/or subject process indicator 123a to assist in guiding operator 106 to the proper location. Further, in some embodiments, inspection system 102 may display a representative image of subject process indicator 123a on inspection device 104 to, for example, assist operator 106 in collecting sample data from the proper process indicator 123, in this case, subject process indicator 123a. The representative image may be, for example, model image 310 (shown and described above in reference to FIG. 3), or a past sample image of subject process indicator 123a.

In the exemplary embodiment, operator 106 activates inspection system 102 (e.g., via inspection device 104) to begin the sample collection process for subject process indicator 123a. Inspection device 104 activates camera 132 (not separately shown in FIG. 5) and operator 106 orients inspection device 104 toward subject process indicator 123a. Inspection device 104 displays a real-time image, as provided by camera 132, in a display area 510 of inspection device 104. More specifically, because of the particular orientation of camera 132, inspection device 104 displays a real-time image of field-of-view 520 of a portion of sensor panel 210 including subject process indicator 123a.

Figure 6:
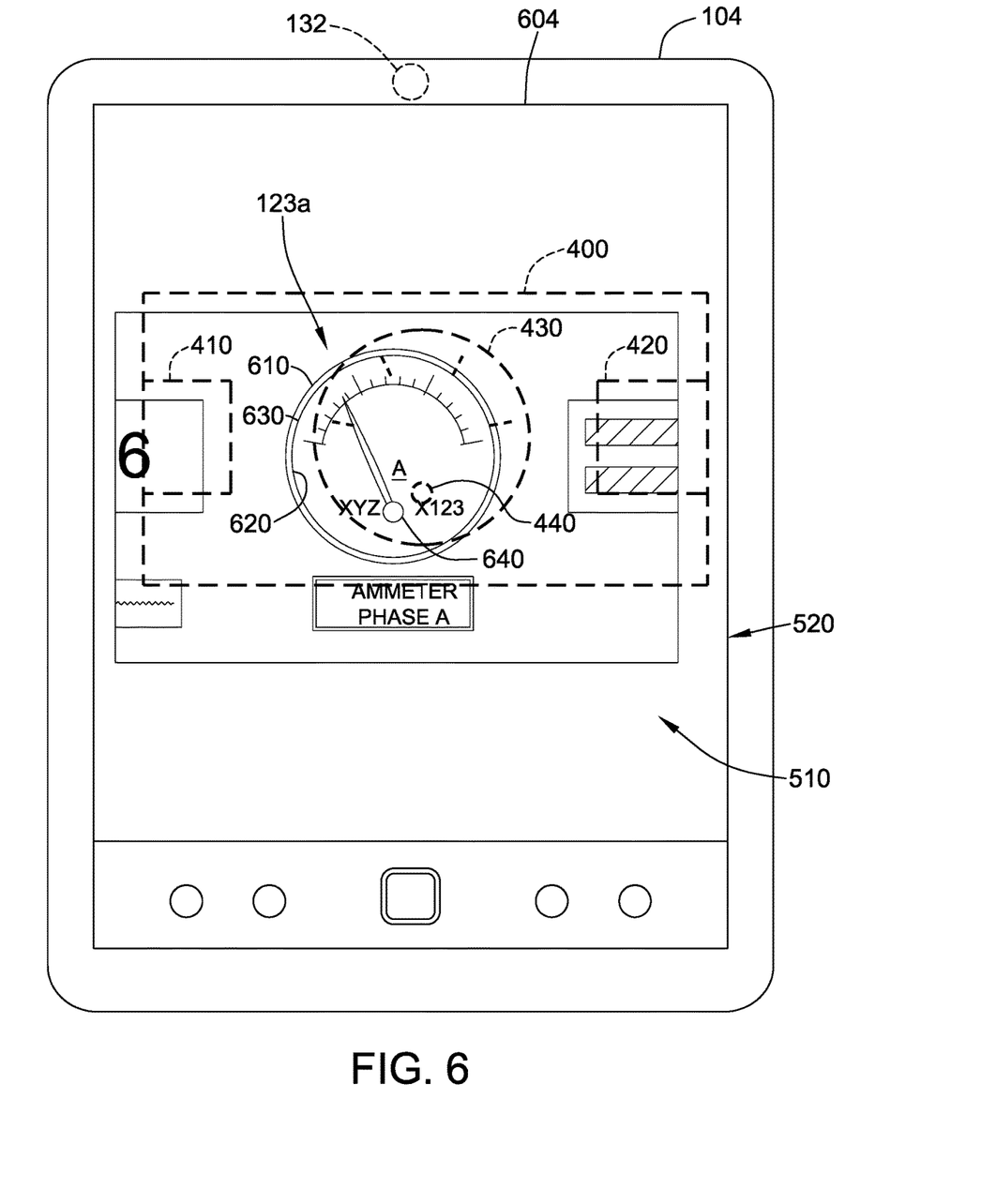
FIG. 6 illustrates an exemplary field-of-view display on inspection device as provided by camera 132 during the exemplary sample collection described above in reference to FIG. 5.

FIG. 6 illustrates an exemplary field-of-view 520 display on inspection device 104 as provided by camera 132 during the exemplary sample collection described above in reference to FIG. 5. Elements in FIG. 6 may be similar to elements as shown and described in relation to FIG. 3. In the exemplary embodiment, inspection device 104 includes a display device 604 on which real-time and static images from camera 132 are presented. In the exemplary embodiment, display device 604 illustrates only a single, complete display area 510 for presenting such images to a user, such as operator 106. In other embodiments, portions of display area 510 may be used for buttons or other functionality, and the images may be displayed in a display area less than the entire display area.

Referring now to FIGS. 5 and 6, inspection system 102 presents both a real-time field-of-view 520 display on inspection device 104 (e.g., on display area 510) as well as an overlay of template frame 400 on display device 604. In FIG. 6, real-time field-of-view 520 elements such as sample gauge edges 610 and 620, sample gauge edge 630, and sample needle center 640 (collectively referred to herein as the sample elements, which may also include other elements not separately identified in FIG. 6) are illustrated in solid lines and template frame 400 elements such as template semi-rectangles 410 and 420, template gauge circle 430, and template needle center circle 440 (collectively referred to herein as template elements) are illustrated in broken lines.

In the exemplary embodiment, the template elements are overlaid onto (e.g., displayed over, and simultaneously with) the real-time image display of field-of-view 520. In other words, operator 106 sees both the real-time image from camera 132 as well as the template elements. In some embodiments, the template elements may be displayed in a particular color, such as white or yellow, such as to be distinguishable on the "background" of the real-time image (e.g., from the sample elements). In some embodiments, the template elements may be displayed as broken-lined elements, such as shown in FIG. 6.

During operation, and as illustrated in FIG. 6, operator 106 has inspection device 104 and camera 132 oriented such that the real-time image (e.g., the sample elements 610, 620, 630, 640) are not aligned with the template elements (e.g., template elements 410, 420, 430, 440). More specifically, inspection device 104 is oriented high and to the right in relation to the template elements such that the sample elements appear low and to the left of the template elements. With the template elements as an indicator of proper positioning, operator 106 then reorients inspection device 104, changing field-of-view 520, until the template elements approximately match up with (e.g., are displayed over) their counterpart sample elements. In other words, to correct the alignment deficiency as shown in FIG. 6, operator 106 would reorient camera 132 lower and to the left until the template elements aligned with the sample elements.

In the example embodiment, misalignment is only illustrated in two directions (e.g., high/low and left/right) for ease of illustration. It should be understood that other misalignments are possible. For example, operator 106 may position inspection device 104 too far or too near to subject process indicator 123*a* relative to template frame 400. In such a misalignment, the sample elements may appear larger or smaller relative to the template elements. For example, if operator 106 holds inspection device 104 too close to subject process indicator 123*a*, sample gauge edge 630 may appear larger than (e.g., of greater diameter than) the associated template gauge circle 430. As such, to correct these types of misalignments, operator 106 may need to move inspection device 104 closer to or farther away from subject process indicator 123*a*, thereby changing field-of-view 520, and thereby altering the shapes of the sample elements in the real-time view as compared to the template elements. Similarly, operator 106 may position inspection device 104 too high and looking down toward, or too low and looking up toward subject process indicator 123*a*. As such, the sample elements may appear accordingly contorted. For example, sample gauge edge 630 may appear as an oval shape rather than circular, like the associated template gauge circle 430. To correct these types of misalignments, operator 106 may need to hold inspection device 104 higher or lower. It should also be understood that various combinations of the above-described types of misalignments are possible.

Once aligned, operator 106 initiates collection of a sample image (not separately shown in FIG. 6) of subject process indicator 123*a*, shown in field-of-view 520 that includes subject process indicator 123*a*). In one embodiment, display area 510 includes a pressable virtual button configured to allow operator 106 activate camera 132 to capture the sample image.

In the exemplary embodiment, upon capture of the sample image, inspection system 102 processes the sample image and extracts a sample process indicator value from the sample image. In some embodiments, inspection device 104 may process the sample image. In other embodiments, inspection device 104 may transmit the sample image to inspection server device 110 (shown in FIG. 1) for processing, and inspection server device 110 may transmit the sample process indicator value back to inspection device 104.

In some embodiments, inspection device 104 may display the sample process indicator value to operator 106. In some embodiments, inspection system 102 may compare the sample process indicator value to a pre-defined target process indicator value and/or a target process indicator range. If the sample process indicator value deviates from the target process indicator value by a pre-determined threshold amount, inspection system 102 may display an alert (e.g., via inspection device 104) to operator 106 indicating, for example, an error in the sample image (e.g., perhaps operator 106 captured the sample image from a similar but incorrect process indicator), or an asset operating outside of norms for that asset.

Figure 7:
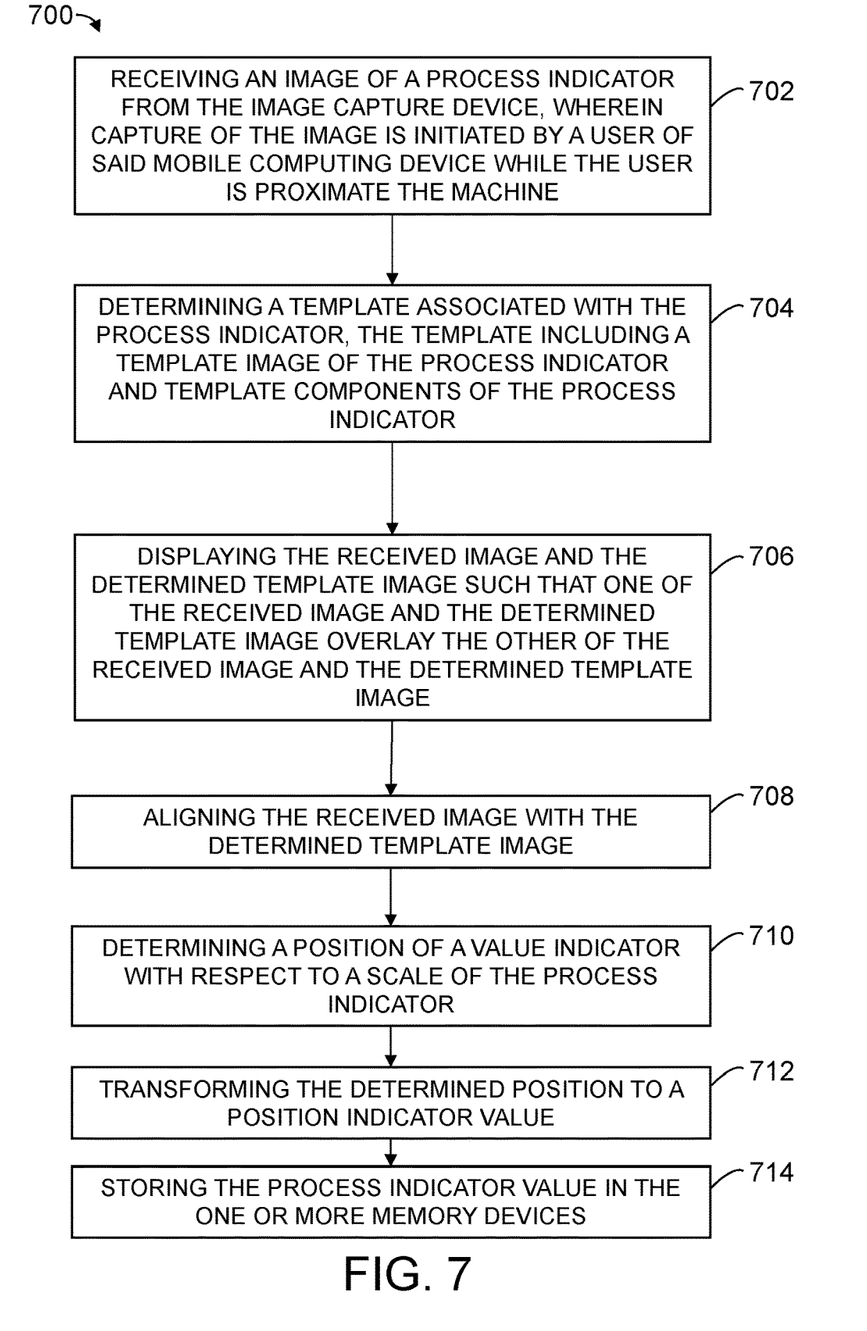
FIG. 7 is a flow chart of an exemplary computer-based method for providing an indication of process readings of a machine.

FIG. 7 is a flow chart of an exemplary computer-based method 700 for providing an indication of process readings of a machine. In the example embodiment, method 700 is implemented using a handheld device coupled to a user interface, a camera, and a memory device. Method 700 includes receiving 702 an image of a process indicator from the camera, wherein capture of the image is initiated by a user of the handheld device while the user is proximate the machine. Method 700 also includes determining 704 a template associated with the process indicator, the template including a template image of the process indicator and template components of the process indicator. The template image is an image that represents a face of the process indictor, such as, but not limited to an actual previously captured image of that process indicator, another similar process indicator, or a rendition of the process indicator that is dimensional proportional to the actual process indicator, or other rendition of the process indicator. The template components include, for example, a scale range, threshold limits, and/or ranges, identifying features, input range, calibration information, and the like. Method 700 further includes displaying 706 the received image and the determined template image such that one of the received image and the determined template image overlay the other of the received image and the determined template image.

Method 700 also includes aligning 708 the received image with the determined template image, determining 710 a position of a value indicator with respect to a scale of the process indicator, transforming 712 the determined position to a process indicator value, and storing 714 the process indicator value in the one or more memory devices.

The above-described embodiments of a method and system of acquiring process information using image data and a preconfigured template frame provides a cost-effective and reliable means for assist the data-entry of values from industrial process indicators, both digital and analog/dial types, by using a camera which is integral to the data collection device. More specifically, the methods and systems described herein facilitate image processing techniques to extract the process indicator value from the image. In addition, the above-described methods and systems facilitate pre-configuring, for each process indicator to be read, information, such as, but not limited to minimum and maximum values, the units of measure, and the database location where this value should be stored. Furthermore a sample photo of the process indicator permits consistent alignment of the camera and reliable automated reading of the correct process indicator, with accuracy. As a result, the methods and systems described herein facilitate maintenance and condition monitoring of equipment in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mobile handheld computing device for providing an indication of process readings of a machine, the mobile handheld computing device comprising:
   a memory device;
   a display device;
   a camera; and
   at least one processor coupled to a non-transitory storage medium storing computer readable instructions, each of the memory device, the display device, the camera, and the at least one processor being integrated within said mobile handheld computing device, the processor being configured to, when executing the computer readable instructions:

receive an image of a process indicator from the camera, wherein receiving the image is initiated using the mobile handheld computing device after the mobile handheld computing device is carried to a location proximate the machine;
determine a template from a plurality of stored templates, each template associated with a process indicator of a plurality of process indicators, the determined template associated with the process indicator captured in the received image at the time the image was captured, the template retrieved from the memory device, the template including a template image of the process indicator and template components of the process indicator;
display the received image and the determined template image such that one of the received image and the determined template image overlay the other of the received image and the determined template image;
align visual elements in the received image and surrounding environment with corresponding framing elements of the determined template image;
determine at least one of a position of a value indicator shown in the received image with respect to a scale of the process indicator shown in the received image and characters of a digital process indicator;
transform the at least one of the determined position and the determined characters to a process value; and
store the process value in the memory device.

2. The mobile handheld computing device of claim 1, wherein the at least one processor is further configured to characterize the process indicator using at least one of a shape of a bezel of the process indicator, a shape of the scale of the process indicator, labels proximate the process indicator, and a color scheme of the process indicator.

3. The mobile handheld computing device of claim 2, wherein the at least one processor is further configured to optically recognize the labels.

4. The mobile handheld computing device of claim 3, wherein the at least one processor is further configured to identify the process indicator using at least one of the characterization and the labels.

5. The mobile handheld computing device of claim 1, wherein the at least one processor is further configured to:
extract one or more features of the process indicator in the received image; and
retrieve a template image from a plurality of predetermined template images stored in the memory device, the retrieved template image including predetermined features that match the extracted one or more features of the process indicator in the received image.

6. The mobile handheld computing device of claim 1, wherein the at least one processor is further configured to:
correlate the determined position of the value indicator to a template position on the determined template image; and
determine a process indicator displayed value based on the correlated position.

7. The mobile handheld computing device of claim 1, wherein the template components of the process indicator include at least one of a scale range, a scale minimum value, a scale maximum value, scale increments, and thresholds associated with the process indicator.

8. The mobile handheld computing device of claim 1, wherein the at least one processor is further configured to:
determine that alignment of the received image with the determined template image has been achieved; and
automatically collect the process value.

9. A computer-based method for providing an indication of process readings of a machine, the method implemented using a handheld mobile computing device coupled to a user interface, a camera, and a memory device, the method comprising:
receiving, by the handheld mobile computing device, an image of a process indicator captured from the camera, wherein receiving the image is initiated using the handheld mobile computing device while the handheld mobile computing device is proximate the machine, each of the memory device, a display device, the camera, and at least one processor being integrated within the handheld mobile computing device;
determining, by the handheld mobile computing device, a template associated with the process indicator from a plurality of stored templates, the determined template including a template image of the process indicator captured from the camera and template components of the process indicator;
displaying the received image and the determined template image overlaid together;
aligning visual elements in the received image and surrounding environment with corresponding framing elements of the determined template image;
determining a position of a value indicator with respect to a scale of the process indicator;
transforming the determined position to a process indicator value; and
storing the process indicator value in the memory device.

10. The method of claim 9, wherein the method further comprises characterizing the process indicator using at least one of a shape of a bezel of the process indicator, a shape of the scale of the process indicator, labels proximate the process indicator, and a color scheme of the process indicator.

11. The method of claim 10, wherein the method further comprises optically recognizing the labels.

12. The method of claim 11, wherein the method further comprises identifying the process indicator using at least one of the characterization and the labels.

13. The method of claim 9, wherein the method further comprises:
extracting one or more features of the process indicator in the received image; and
retrieving a template from a plurality of predetermined templates stored in the memory device, the retrieved template including predetermined features that match the extracted one or more features of the process indicator in the received image.

14. The method of claim 9, wherein the method further comprises:
correlating the determined position of the value indicator to a template position on the determined template image; and
determining a process indicator displayed value based on the correlated position.

15. The method of claim 9, further comprising storing, by the handheld mobile computing device, template components of the process indicator that include at least one of a scale range, a scale minimum value, a scale maximum value, scale increments, and thresholds associated with the process indicator.

16. One or more non-transitory computer-readable storage media having computer-executable instructions embodied thereon, wherein when executed by at least one processor of a handheld mobile computing device, the computer-executable instructions cause the processor to:

receive an image of a process indicator from a camera of the handheld mobile computing device, wherein receiving the image is initiated using the handheld mobile computing device while the handheld mobile computing device is proximate the machine, each of a memory device, a display device, the camera, and the at least one processor being integrated within said handheld mobile computing device;

determine a template associated with the process indicator, the determined template including a template image of the process indicator and template components of the process indicator;

display the received image and the determined template image overlaid together;

align visual elements in the received image and surrounding environment with corresponding framing elements of the determined template image;

determine a position of a value indicator with respect to a scale of the process indicator;

transform the determined position to a process indicator value; and store the process indicator value in the memory device.

17. The computer-readable storage media of claim 16, wherein the computer-executable instructions further cause the processor to characterize the process indicator using at least one of a shape of a bezel of the process indicator, a shape of the scale of the process indicator, labels proximate the process indicator, and a color scheme of the process indicator.

18. The computer-readable storage media of claim 17, wherein the computer-executable instructions further cause the processor to optically recognize the labels.

19. The computer-readable storage media of claim 17, wherein the computer-executable instructions further cause the processor to identify the process indicator using at least one of the characterization and the labels.

20. The computer-readable storage media of claim 16, wherein the computer-executable instructions further cause the processor to:

extract one or more features of the process indicator in the received image; and retrieve a template from a plurality of predetermined templates stored in the memory device, the retrieved template including predetermined features that match the extracted one or more features of the process indicator in the received image.

21. The computer-readable storage media of claim 16, wherein the computer-executable instructions further cause the processor to:

correlate the determined position of the value indicator to a template position on the determined template image; and determine a process indicator displayed value based on the correlated position.

* * * * *